United States Patent [19]

Davidson

[11] Patent Number: 5,678,239

[45] Date of Patent: Oct. 14, 1997

[54] TREATMENT OF RADIOACTIVE MATERIAL

[75] Inventor: Ian David Farquhar Davidson, Aberdeen, United Kingdom

[73] Assignee: Scotoil Group plc, Aberdeen, United Kingdom

[21] Appl. No.: 640,690

[22] Filed: May 1, 1996

[30] Foreign Application Priority Data

Feb. 24, 1996 [GB] United Kingdom ............... 9603947

[51] Int. Cl.$^6$ ..................................................... G21F 9/00
[52] U.S. Cl. ........................... 588/16; 166/247; 405/128
[58] Field of Search ..................... 588/9, 16; 166/247; 405/128

[56] References Cited

U.S. PATENT DOCUMENTS

| | | | |
|---|---|---|---|
| 4,691,772 | 9/1987 | Ebenback et al. | 166/254 |
| 5,165,275 | 11/1992 | Donovan | 73/153 |
| 5,225,674 | 7/1993 | Frantz et al. | 250/260 |

FOREIGN PATENT DOCUMENTS 2 272 566  5/1994  United Kingdom ................ 9/28

*Primary Examiner*—Ngoclan Mai
*Attorney, Agent, or Firm*—Heslin & Rothenberg, P.C.

[57] ABSTRACT

A process for treating naturally occurring radioactive material (NORM) comprises use of NORM as a mud constituent in a drilling mud manufacturing process and particle size reduction of the NORM particles during or before that process to attain a selected particle size corresponding to that of a particulate drilling mud component, said particle size reduction being optionally accompanied by additional mixing, if necessary, of the NORM and mud component particles, the aim of said use being the achievement of irreversible dilution of the NORM particles in said component to nullify the radioactive nature thereof.

12 Claims, 1 Drawing Sheet

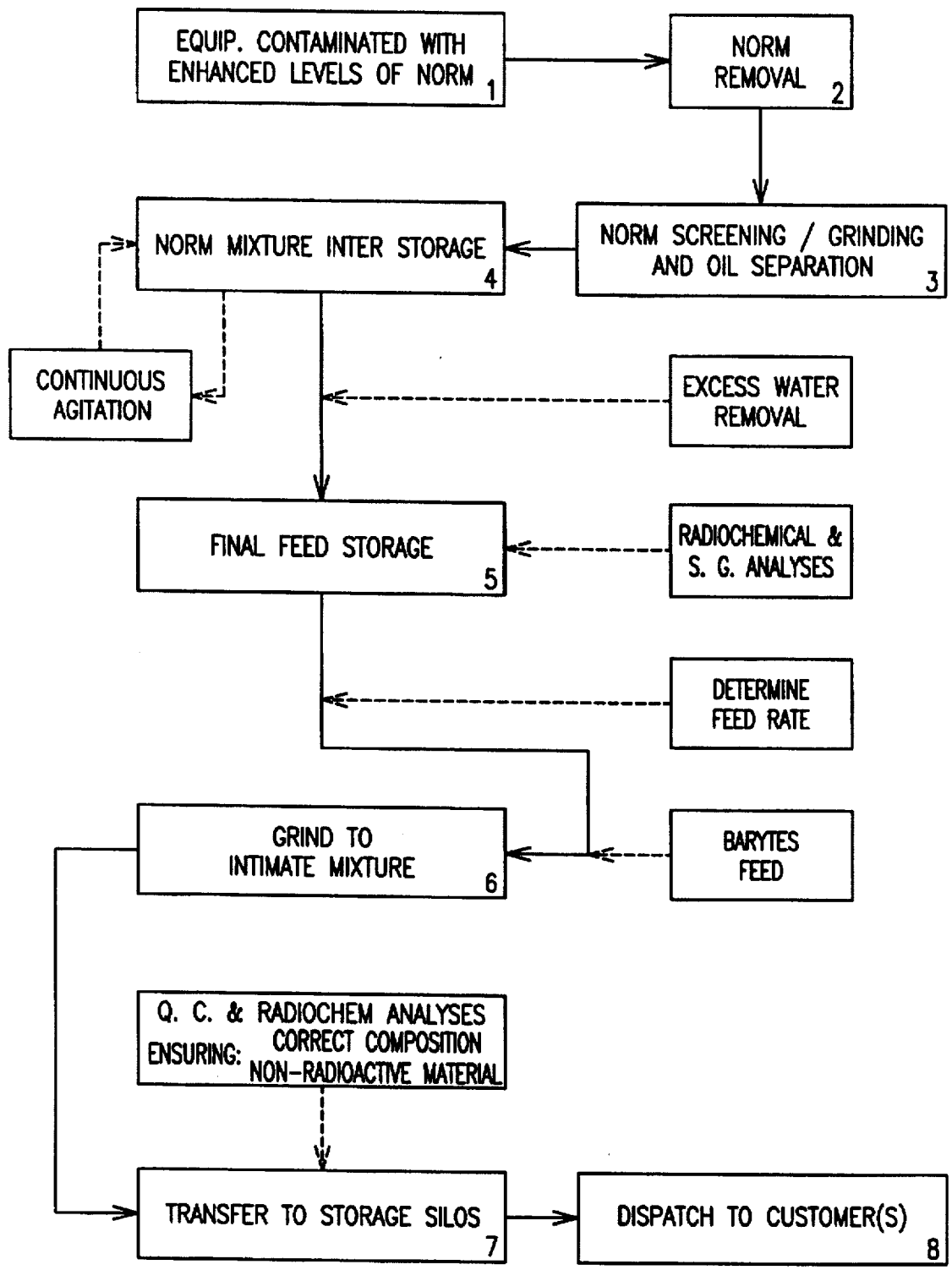

TREATMENT OF RADIOACTIVE MATERIAL

TECHNICAL FIELD

The present invention relates to a process for handling a radioactive waste material resulting from oil and gas recovery operations.

BACKGROUND OF THE INVENTION

In the recovery of oil and gas it is necessary to take account of the presence of naturally occurring radioactive material (NORM) in produced fluids and gases which give rise to radioactive process deposits such as scales and sludges. The nature of NORM is well known in this field and mainly involves Uranium 238 and Thorium 232 and daughter isotopes occurring naturally in the geological formations surrounding the oil and gas reservoirs. Process operating conditions of reducing pressure and temperature contribute to the formation of deposits in which the radioactive species have been incorporated and concentrated. The deposits manifest as scale and sludge deposits within conduits, valves, and the like components of oil and gas production plant.

The treatment of such scale and deposits has to satisfy legislative requirements regarding health and environmental aspects in providing suitable measures for dealing with the accumulated radioactive materials (NORM).

There is a proposal in GB-A-2 272 566 to address this problem by a procedure involving melting of fouled steel components with a slag former so that radioactively contaminated scale and sludge separates from the molten steel with the formation of a slag which preferentially incorporates the radioactive contaminants. The amount of slag former to be used is predetermined to provide a slag of a predictable low level of radioactivity considered to be safe according to current legislative requirements.

The application of that proposal is confined to spent equipment and plant of essentially scrap value. That process is not suitable for use in relation to active plant operations.

If one looks broadly at the measures adopted to deal with toxic substances they fall in to two classic categories i.e. (a) secure containment to shield the environment from the adverse effects thereof, and (b) dilution to reduce the perceptible hazardous effects to acceptable levels. As far as radioactive hazardous wastes are concerned, high level radioactive material is generally contained in secure containers with appropriate shielding e.g. lead whilst lower level radioactive material may be mixed with concrete and the resulting blocks buried at licensed sites or disposed of at sea. Such measures do not offer a solution in the field of interest.

An object of the present invention is to provide a means of dealing with NORM in produced fluids and gases from oil and gas reservoirs in a working plant environment. A further object of the present invention is to provide a process for treating NORM and turning the treated material to advantage in the industry. In particular it is an object of the invention to obviate or mitigate the problem presented by the radioactive hazards of NORM.

Considering the problem at hand one finds that NORM represents a particular hazard to personnel who operate, maintain and clean the drilling and ancillary equipment by exposure to radioactivity by prolonged proximity to NORM deposits and possible inhalation of NORM airborne particles.

Typically NORM scale as recovered from steelwork is a fine powder, coarse particles or large flakes, of density of about 2 to 4 g/ml, which will show activity of up to approximately 2000 Bq/g whilst permissible levels from the point of view of personnel protection require a maximum tolerance of about 0.37 Bq/g.

Currently there are two approved procedures for cleaning of NORM contaminated equipment and disposal of NORM waste onshore. These are:

(a) NORM removal by high pressure water jetting, size reduction to minute particle size, dilution in sea water and dispersal at sea through a dedicated pipeline; or (b) NORM removal by high pressure water jetting, concentration of removed material by filtration and collection, then onshore long term storage.

As a matter of continuin improvement of procedures it is desirable to develop other ways of tackling this problem.

SUMMARY OF THE INVENTION

Accordingly the present invention provides a process for treating naturally occurring radioactive material (NORM). The process comprises a particle size reduction step wherein the NORM particles are treated to attain a selected particle size corresponding to that of a particulate drillin mud component. A suitable mud component preferred for this purpose is barites (barytes) because of its high opacity with respect to radioactivity. The particle size reduction is conveniently accomplished by co-grinding of the NORM and mud component particles. However separate grinding and mixin steps may also be applied. The present treatment process is conducted with the aim of achieving irreversible dilution of the NORM particles in a selected mud component thereby nullifying the radioactivity thereof and enabling the mixed particles to be readily used in formin a drilling mud. It will be understood by those skilled in the art that the particle size reduction step may be achieved by any of grinding, milling, crushing or pulverising provided that the size reduction step is pursued until a substantially uniform particle size is obtained for the NORM and mud particles. It will also be apparent that both NORM and mud components may be sized separately and then mixed. However it would be convenient to introduce the coarse NORM material as recovered by usual techniques to a selected particulate mud component and subject the whole to an appropriate sizing procedure to produce a substantially homogeneous blend or mixture for use in the subsequent mud manufacturing process. Such a simultaneous particle size reduction step avoids or at least reduces the need for additional mixing steps and tends to ensure that uniformity of particle size is achievable.

The manner of forming the drilling mud, aside from the inventive treatment and usage of NORM, is immaterial and it may be accomplished in a manner otherwise known per se in the art. The advantages of the invention are achieved particularly by careful selection of particle size of the NORM particles and matching the selected size to that of a substantial component of proposed drilling mud, e.g. particles of weighting agent, filler, viscosity modifier or density regulating agents such as barytes, bentonite, calcium carbonate and the like. By such matching of the particle size the dilution of the NORM particles in the drilling mud component(s) forms a solids solution which is effectively inseparable under the normal conditions of use of a drilling mud. Thus the NORM particle components are irreversibly diluted to remove hazard risks and moreover the usual need to treat the NORM particles as active waste is obviated. Any losses of the new mud downhole merely returns the included NORM particles to the geological region from which the NORM particles originated. Thus the invention provides a neat "invisible" means of disposal of the NORM particles and also provides a utility therefor by inclusion in a working material.

The possibility of wet grinding and mixing of particles is also a possibility and this could offer the option of use of spray heads for fine particle mixing, though this would require account to be taken of the higher downstream process water content. If removal of water at later stages of mud manufacture would be problematic then dry particle mixing will be preferred.

As mentioned above the selection of a particle size reduction method is not critical and any convenient method may be utilised provided that consistent substantially uniform and predictable particle size is attainable thereby. Thus fine grinding, milling, crushing and variations and combinations thereof would be considered. The actual particle size is not critical since the important aspect is to match the selected particle size with that of the intended particulate solids diluent. Obviously due regard would be given to the particle sizes necessary for manufacturing a stable functional mud. However it is the identical or close size match which results in essentially irreversible dilution in the mixing process. Taking the example of utility in drilling mud manufacture then typically the particle size will be (as determined according to American Petroleum Institute sizing standards) of the order of 97%<75μ.

BRIEF DESCRIPTION OF THE DRAWING

In the single accompanying drawing a process for drilling mud manufacture, using NORM, is schematically represented.

The invention will now be more specifically described by way of example without the intention of limiting the scope of the invention thereto.

DESCRIPTION OF PREFERRED EMBODIMENTS

Following one of the approved equipment decontamination procedures an aqueous fluid containing NORM is treated by an appropriate separation procedure to extract NORM leaving water and oil to be reprocessed by other measures. A typical practical embodiment of this process is illustrated in the accompanying diagram.

The extracted NORM is subjected to an optional preliminary particle size reduction by grinding to attain a convenient particle size and the particles obtained are introduced to a feed of fresh barytes particles. Final grinding and mixing of these materials is achievable in a number of ways known in the art for intimate solids mixing and should be continued to obtain a substantially homogeneous material of appropriate particle size for drilling mud manufacture e.g. of about 75μ for at least about 97% of the material (A.P.I.). Appropriate sampling coupled with radiochemical analysis enables a routine procedure to be determined for a particular source of NORM. Thus some initial trivial experimentation enables satisfactory grinding/mixing periods to be calculated.

In this example a scale having an activity of 50 Bq/g is treated by particle size reduction and mixing with size matched bulk barytes particles (the barytes has negligible activity) at the rate of 1 g scale per 1 kg barytes. This dilution means a final activity of 0.05 Bq/g, a factor of 10 lower than the limit of 0.37 Bq/g. It should be noted that the selected bulk particulate material may equally be bentonite or carbonate.

In a further example for a scale exhibiting activity at 500 Bq/g, a dilution of 1 g scale to 10 kg barytes is applied.

In variants of the process the NORM scale removed from process equipment by an approved decontamination procedure and which may be a fine powder, coarse particles or flakes is optionally sized to match another mud component bentonite or calcium carbonate provided that the essential step of providing a close particle size match is observed. The NORM to be processed may be added during differing stages of the mud manufacture provided that an appropriate size reduction step is applied to the NORM alone or in admixture with another particulate material.

Whilst the foregoing description of preferred embodiments represents the best mode currently known to the inventor it will be understood by those in the art that variants other than those specifically described are possible and the scope of the invention is only to be determined by the ambit of the following claims.

I claim:

1. A process for treating naturally occurring radioactive material (NORM) which comprises selecting NORM for use as a mud constituent in a drilling mud manufacturing process, reducing particle size of the selected NORM to attain a selected particle size of NORM particles matching that of a particulate drilling mud component, and diluting the NORM particles in said component to nullify the radioactive nature of the NORM.

2. The process of claim 1 wherein the NORM is subjected to particle size reduction before use in the drilling mud manufacturing process.

3. The process of claim 1 wherein the NORM is mixed with said particulate drilling mud component before use in the drilling mud manufacturing process.

4. The process of claim 1 wherein the mud component and NORM are subjected to a simultaneous particle size reduction process.

5. The process of claim 1 wherein the NORM is mixed with said particulate drilling mud component and subjected to particle size reduction in one step during the drilling mud manufacturing process.

6. A process for treating naturally occurring radioactive material (NORM) which comprises the steps of
   (a) selecting at least one particulate material for use as a drilling mud component;
   (b) reducing particle size of the NORM to obtain NORM particles of a selected particle size matching that of the said at least one particulate material;
   (c) intimately mixing the NORM particles and the said at least one particulate material in a proportion that dilutes the NORM particles in said at least one particulate material so as to effectively nullify the radioactive nature of the NORM; and using the mixed particles in a drilling mud manufacturing process.

7. A process for treating naturally occurring radioactive material (NORM) which comprises
   (i) selecting at least one particulate material for use as a drilling mud component;
   (ii) mixing the selected at least one particulate material with NORM;
   (iii) reducing particle size of the mixed NORM and selected at least one particulate material to obtain particles of NORM and particles of said at least one particulate material all of a selected substantially uniform particle size corresponding to that suitable for use in drilling mud; and (iv) diluting said particles of NORM in said particles of said selected at least one particulate material so as to nullify the radioactive nature of the NORM.

8. The process of claim 1 or claim 6 or claim 7 wherein the mud component is a particulate material selected from the group consisting of viscosity controller, weighting agents, density modifiers, lost circulation materials, fillers and extenders.

9. The process of claim 1 or claim 6 or claim 7 wherein the mud component is a particulate material selected from the group consisting of bentonite, barites, and limestone.

10. The process of claim 1 or claim 6 or claim 7 wherein the particles are sized such that about 97% are less than 75μ (A.P.I.).

11. A process for treating naturally occurring radioactive material (NORM) which comprises selecting at least one essentially non-radioactive solid material in particulate form, reducing particle size of the NORM to attain a selected particle size of NORM particles matching that of the selected essentially non-radioactive solid material, and mixing of the NORM with the selected essentially non-radioactive solid material such that irreversible dilution of the NORM particles in said non-radioactive material nullifying the radioactive nature of the NORM is achieved.

12. The process of claim 11 wherein NORM and the selected essentially non-radioactive solid material are subjected to particle size reduction together to achieve a substantially uniform particle size and mixing thereof in the same step.

* * * * *